United States Patent [19]

Vowles et al.

[11] Patent Number: 5,438,877
[45] Date of Patent: Aug. 8, 1995

[54] PRESSURE SENSOR PACKAGE FOR REDUCING STRESS-INDUCED MEASUREMENT ERROR

[75] Inventors: David L. Vowles, Phoenix; Clem H. Brown, Scottsdale, both of Ariz.

[73] Assignee: Motorola, Inc., Schaumburg, Ill.

[21] Appl. No.: 258,889

[22] Filed: Jun. 13, 1994

[51] Int. Cl.$^6$ ............................................. G01L 7/00
[52] U.S. Cl. ........................................ 73/756; 73/716; 73/863.71; 73/727
[58] Field of Search .................. 73/756, 716, 863.71, 73/727

[56] References Cited

U.S. PATENT DOCUMENTS

| | | | |
|---|---|---|---|
| 4,984,468 | 1/1991 | Häfner | 73/727 |
| 5,257,547 | 11/1993 | Boyer | 73/756 |
| 5,317,924 | 6/1994 | Maack | 73/756 |
| 5,333,507 | 8/1994 | Vogler et al. | 73/756 |
| 5,351,550 | 10/1994 | Maurer | 73/727 |

Primary Examiner—Richard E. Chilcot, Jr.
Assistant Examiner—Jewel V. Artis
Attorney, Agent, or Firm—Bruce T. Neel

[57] ABSTRACT

A pressure sensor package (10) has a sensor body (12) for containing a pressure sensor. An elongated stem (14) has a first end connected to the sensor body (12), and a connector (24, 26) is disposed on a second end of the stem (14) for fixedly mounting the stem (14) to a mounting base (40), which is connected to, for example, a fuel tank (52). An annular sealing surface (28) is disposed on the first end of the stem (14) for pressing against a compressible seal (44) when the stem (14) is mounted to the mounting base (40), and an orifice (18) is disposed at the second end of the stem (14). The orifice 18 is connected to the pressure sensor by a passage (20, 22) through the stem body. The connector (24, 26) is spaced a sufficient distance from the sensor body (12) to substantially reduce error-inducing stresses on the pressure sensor.

18 Claims, 4 Drawing Sheets

PRESSURE SENSOR PACKAGE FOR REDUCING STRESS-INDUCED MEASUREMENT ERROR

BACKGROUND OF THE INVENTION

The present invention relates, in general, to electronic sensor packages and, more particularly, to pressure sensor packages for reducing stress-induced measurement error.

A gasoline tank rollover valve containing a pressure sensor will likely be required in a few years for all cars and light trucks produced for sale in the United States. Prior pressure sensor packages have been attached to liquid fuel tanks either to a mounting assembly on the tank itself or to an assembly at a remote location of the vehicle with a pressure-transmitting tube connecting the fuel tank to the pressure sensor. However, in both cases, these prior pressure sensors have suffered from stress-induced measurement errors due to the need to mount the pressure sensor to a portion of the vehicle. Examples of such stress include vehicle vibration and thermal expansion due to temperature changes.

Because a pressure sensor typically incorporates a sensitive thin silicon membrane disposed on a semiconductor die, vibration and thermal expansion that are transmitted through sensor mounting hardware, both from the hardware itself and the vehicle it is mounted on, contribute to pressure measurement error. Accordingly, there is a need for a pressure sensor that reduces stress-related measurement errors from vehicle vibration, thermal variations, and other related factors in order to accurately determine the pressure of the vapor in an automobile's fuel tank.

DETAILED DESCRIPTION OF THE DRAWINGS

Briefly stated, in a first embodiment the present invention provides a pressure sensor package having a sensor body containing a pressure sensor. An elongated stem has a first end connected to the sensor body, and a connector is disposed on a second end of the stem for fixedly mounting the stem to a mounting base, which is connected to, for example, a fuel tank. An annular sealing surface is disposed on the first end of the stem for pressing against a compressible seal when the stem is mounted to the mounting base, and an orifice is disposed at the second end of the stem. The orifice is connected to the pressure sensor by a passage through the stem body. An advantage thereby achieved by the present invention is that the connector is spaced a sufficient distance from the sensor body to substantially reduce error-inducing stresses on the pressure sensor.

Figure 1:
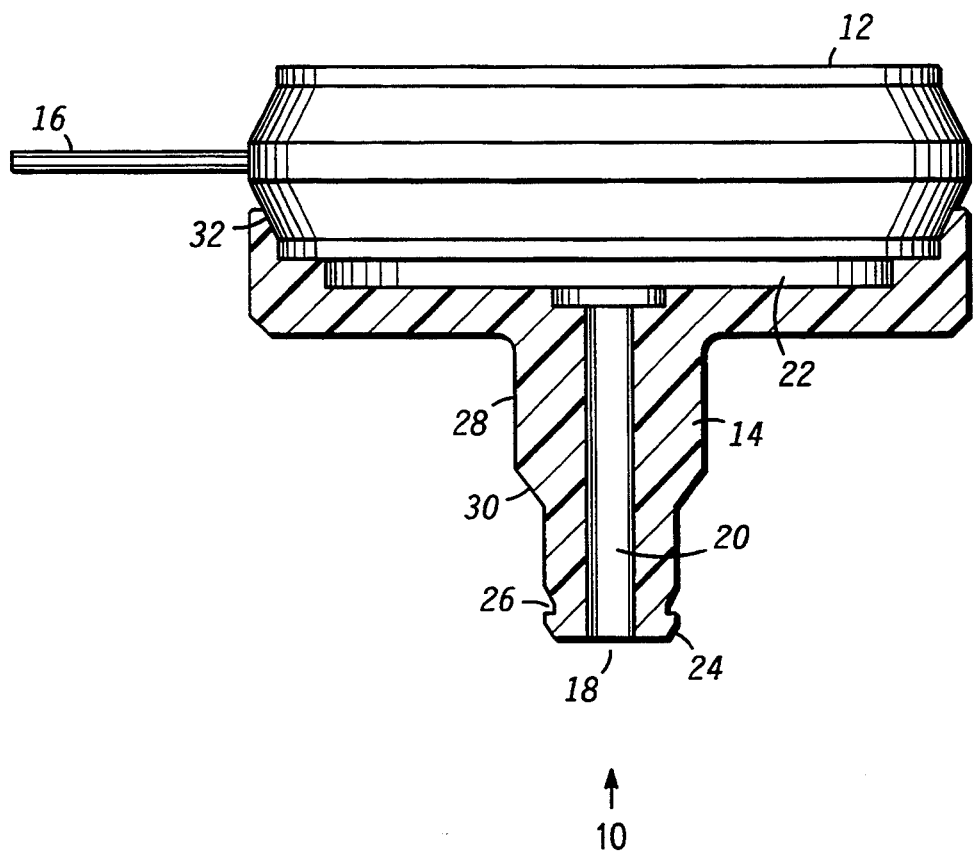
FIG. 1 illustrates a partial cross-section of a pressure sensor package according to a first embodiment of the present invention.

The present invention can be more fully described with reference to FIGS. 1–4. FIG. 1 illustrates a partial cross-section of a pressure sensor package 10 according to a first embodiment of the present invention. A sensor body 12 contains a pressure sensor (not shown), which for the sake of discussion here is, for example, a silicon pressure sensing die. Types of silicon pressure sensing dies that may be used in package 10 include ceramic or capacitive silicon differential sensing dies, which may also be temperature compensated and/or have an amplified output. However, in addition to these dies, one skilled in the art will recognize that a wide variety of other pressure sensing dies or sensors may be used in package 10 with the present invention.

Sensor leads 16 are coupled to the pressure sensing die and provide an electrical output from it. A stem 14 is connected to sensor body 12 and has an orifice 18 for sensing pressure. Orifice 18 is connected to the sensing die by a passage 20 and a cavity 22. Cavity 22 is connected to the sensing die by an opening (not shown) in sensor body 12. Stem 14 has a lip 24 and a mating recess 26 that are used as a connector for mounting stem 14 to a mounting base 40 (shown in FIG. 2). Stem 14 has an annular sealing surface 28 for pressing against a compressible seal 44 (shown in FIG. 2). Stem 14 also has a taper 30 to aid in guiding stem 14 into mounting base 40. Stem 14 is connected to sensor body 12 at a joint 32.

Sensor body 12 and stem 14 are preferably formed from a plastic exhibiting both polar and non-polar chemical resistance. Suitable materials include organic epoxies and thermoplastics filled with inorganic matter. Selection of the materials is governed by the large temperature range to which the sensor body 12 and stem 14 will be exposed in, for example, an automotive application. Also, materials selected for a fuel tank application should resist chemical attack by the fuel.

Figure 2:
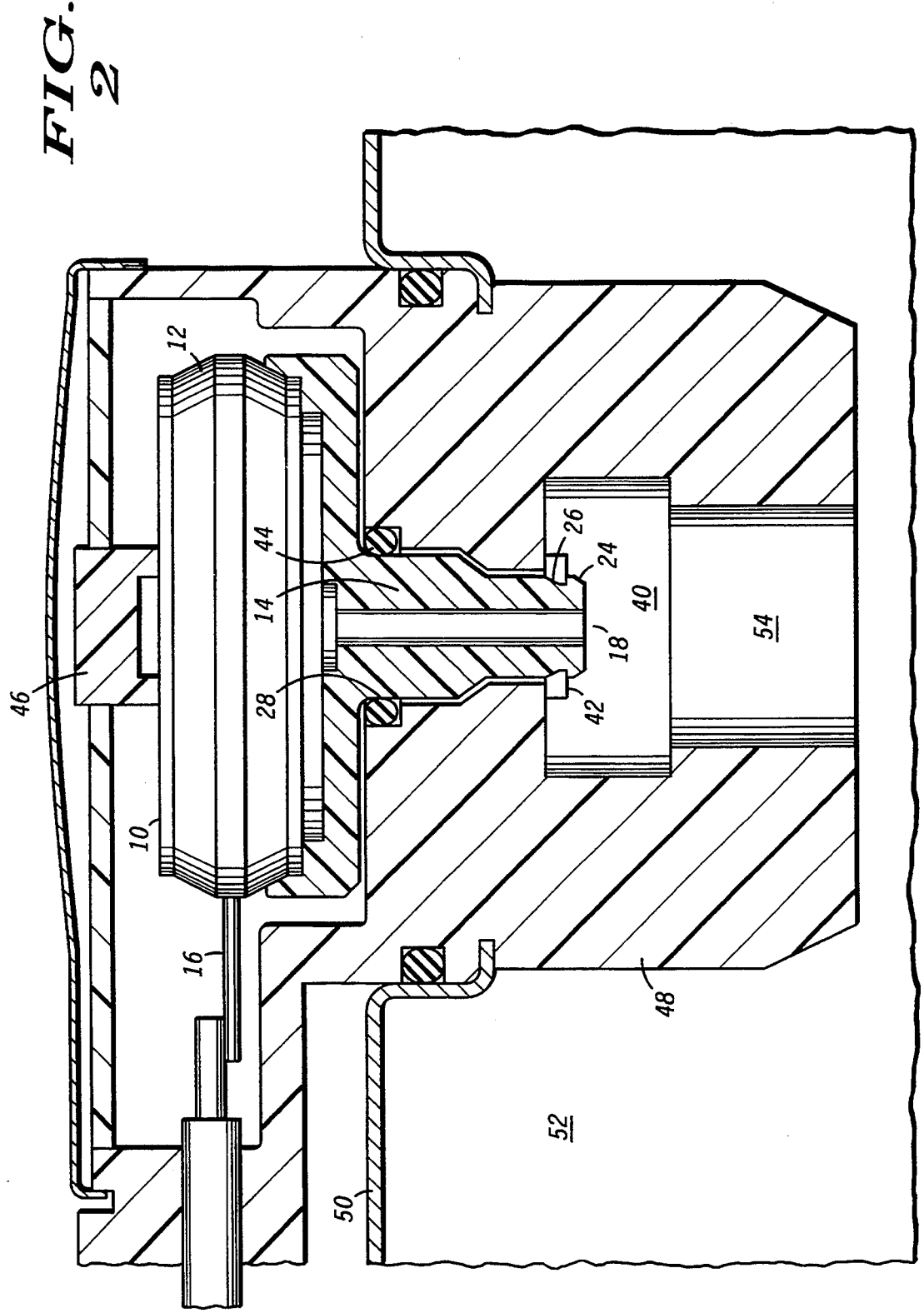
FIG. 2 illustrates the sensor package of FIG. 1 mounted in a base connected to a fuel tank.

FIG. 2 illustrates sensor package 10 mounted in mounting base 40. Specifically, stem 14 is connected to mounting base 40 by passing lip 24 over a retainer lug 42 so that lug 42 fits within mating recess 26. This configuration provides a snap fit of stem 14 into mounting base 40. As stem 14 is inserted into mounting base 40, sealing surface 28 presses against compressible seal 44, such as an o-ring. One skilled in the art will recognize that different portions of sealing surface 28 will press against seal 44 depending on the particular type of seal used. Seal 44 should provide polar and non-polar chemical resistance and should maintain substantial elasticity and compression throughout the anticipated temperature conditions expected. In a preferred embodiment, seal 44 is a radial seal. Also, seal 44 should be fuel resistant for fuel tank applications. Suitable seal materials include nitrile rubber or fluorocarbon rubber compounds.

The compression of seal 44 in combination with the snap fit of stem 14 into mounting base 40 securely mounts sensor package 10 in place. An optional filter 46 may be used as a water barrier filter that allows atmospheric pressure to reach a second port of the pressure sensing die in sensor body 12 when differential pressure sensing is to be performed. Filter 46 may be formed of expanded polytetraflouroether. However, filter 46 is not necessary for mounting sensor package 10.

Mounting base 40 is a part of a housing 48 that is connected to a tank wall 50 of a fuel tank 52. Vapor from fuel tank 52 passes through a vapor inlet 54 to orifice 18 so that the pressure of the vapor may be sensed by the sensing die contained within sensor body 12. As part of its design and function, the silicon sensing die is sensitive to pressure applied to it's diaphragm. This pressure should ordinarily be applied by the force of a liquid or vapor that the sensing die is intended to measure. However, physical stresses inflicted on the sensing die by its packaging may produce a false "pressure" causing an erroneous signal output that does not truly represent the liquid or vapor pressure. These physical stresses may be created by a mismatch of thermal expansion characteristics of the different materials used in sensor body 12, stem 14, the adhesive that bonds these two together, and housing 48. It is desirable to reduce these stresses as much as possible so that the operation of the sensing die is true. This is preferably accomplished by using materials that have low, but similar, degrees of thermal expansion.

The design of stem 14 shown here is such that the stresses that do occur in package 10 are focused vertically. This results in a motion that can freely move sensor package 10 relative to seal 44. This vertical motion minimizes stress transfer to the sensing die. When a sufficient distance is provided between sealing surface 28 and retainer lug 42, error-inducing stress on the sensing die is substantially reduced. In the preferred embodiment, the distance from ceiling surface 28 to retainer lug 42 is at least about 38 mm.

Sensor package 10 may be assembled by affixing the silicon sensing die to sensor body 12 with an elastomeric, stress-isolating, adhesive bonding agent (examples include fluorosilicone, thermoplastic, and polythioether). Sensor body 12 may be formed of molded epoxy (for example epoxy novolac) or thermoplastic. Electrical interconnects are provided by wires from the semiconductor die to electrical lead interconnects in sensor body 12. Stem 14 is molded of a thermoplastic such as polyphenyl sulfide (chosen for its physical and chemical resistance properties). Stem 14 is affixed to sensor package 10 with a semi-rigid adhesive bonding agent. Adhesive bonding agent materials that provide stress isolation by allowing independent thermal expansion of the plastic package body 10, and further provide polar and non-polar chemical resistance, include organic epoxies or elastomers filled with inorganic matter.

Figure 3:
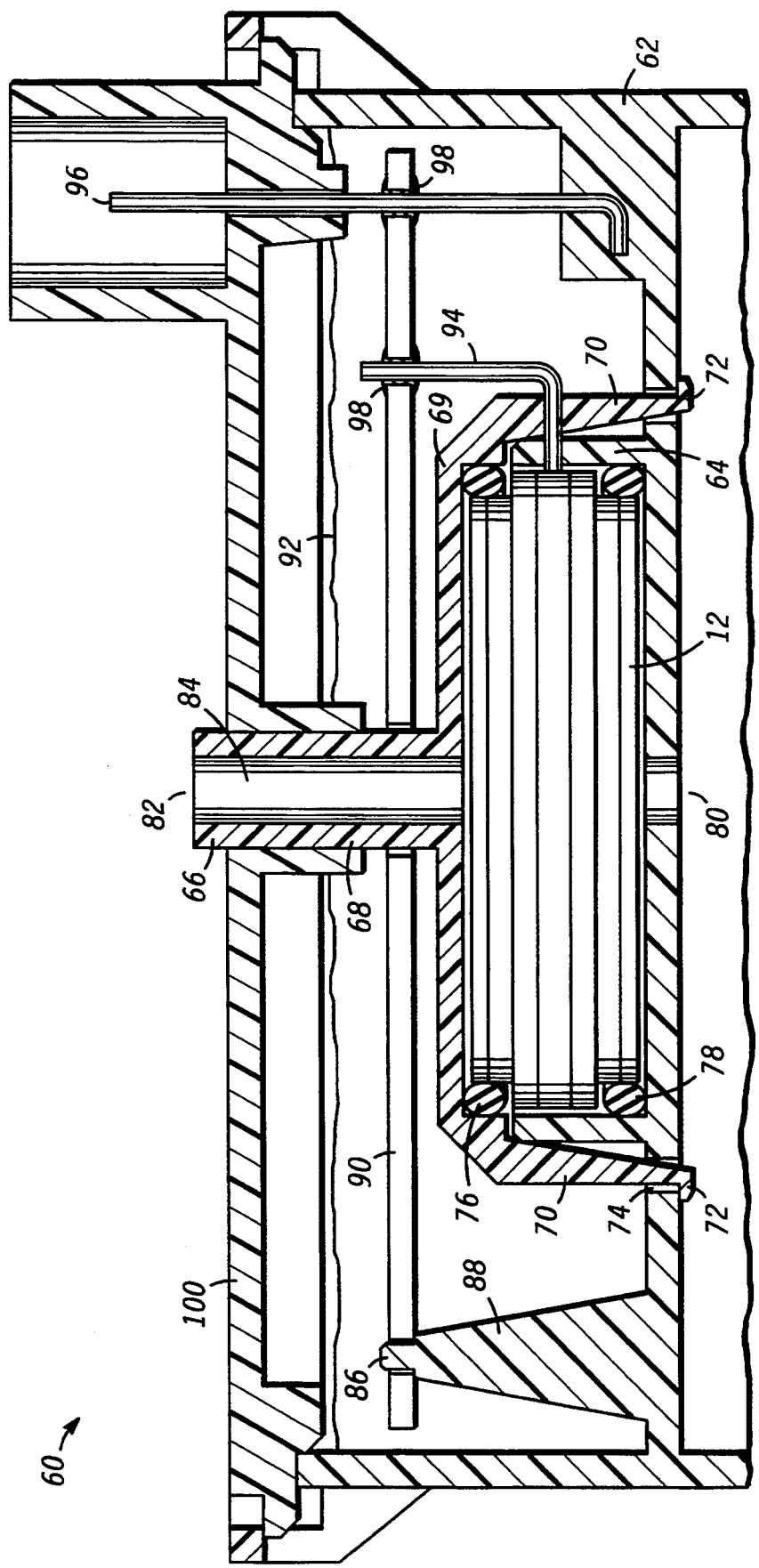
FIGS. 3 and 4 illustrate cross-sections of pressure sensor mounting assemblies, having printed circuit boards located inside a sensor housing, according to alternative embodiments of the present invention.

FIG. 3 illustrates a cross-section of a pressure sensor mounting assembly 60 according to a second embodiment of the present invention. A housing 62 has a receptacle 64 for holding sensor body 12, which contains, for example, a pressure sensing die (not shown). A clamp 66 has a base 69 which fits over sensor body 12. Arms 70 are disposed on base 69 and have lugs 72 which snap-fit into openings 74 of housing 62. Clamp 66 when installed in housing 62 secures sensor body 12 inside receptacle 64. Sensor body 12 is isolated from housing 62 and clamp 66 by a compressible seal 76, which is disposed in a corner of clamp 66, and a compressible seal 78, which is disposed in a corner of housing 62. Seals 76 and 78 may be, for example, o-rings or radial seals. When mounted in this manner, stress transfer to the sensing die is substantially reduced because sensor body 12 is substantially only touching compressible material.

As discussed above for the first embodiment, physical stresses inflicted on the sensing die by its package produce a false "pressure" causing an erroneous signal output that does not truly represent a liquid or vapor pressure. These physical stresses are created by a mismatch of thermal expansion characteristics of the different materials used, for example, in sensor body 12 and housing 62. It is desirable to reduce these stresses as much as possible so that the operation of the sensing die is true. This is accomplished by utilizing elastomeric seals that are compressible to hold sensor body 12 in place by clamp 66. This minimizes thermal expansion and results in free movement of sensor body 12 while maintaining a good seal.

An orifice 80 is disposed in housing 62 for pressure sensing by a first port of the sensing die. Also, an orifice 82 is disposed in clamp 66 and connected by a passage 84 for pressure sensing by a second port of the sensing die. Orifices 80 and 82 may be used individually, or in combination when sensing a differential pressure.

A positioning lug 86 is disposed on a boss 88 for positioning a circuit board 90 within housing 62. Circuit board 90 is disposed in a potting 92 such as an electronic grade elastomer or gel. Potting 92 prevents mechanical shock to circuit board 90 and tends to substantially maintain the position of circuit board 90 relative to housing 62.

Circuit board 90 is coupled to the sensing die by sensor leads 94 for processing sensing die signals and is electrically coupled to the outside world by output leads 96. Both leads 94 and 96 are connected to circuit board 90 by solder contacts 98. A cover 100 fits over a shaft 68 of clamp 66 and snaps into place over housing 62.

A clearance is provided between positioning lug 86 and circuit board 90 so that board 90 is allowed to float vertically or horizontally in potting 92. This float accommodates thermal expansion of, for example, sensor leads 94 and output leads 96. It should be noted that circuit board 90 is not firmly fixed in place by positioning lug 86. Although circuit board 90 is fastened to sensor leads 94 and output lead 96, thermal expansion and contraction may result in movement of board 90 relative to housing 62 by about, for example, 0.25 mm. Because board 90 is not fixed in place and the clearance above is provided, it may move relative to positioning lug 86 to accommodate this expansion and thus avoid cracking of solder connections or other components of assembly 60.

Figure 4:
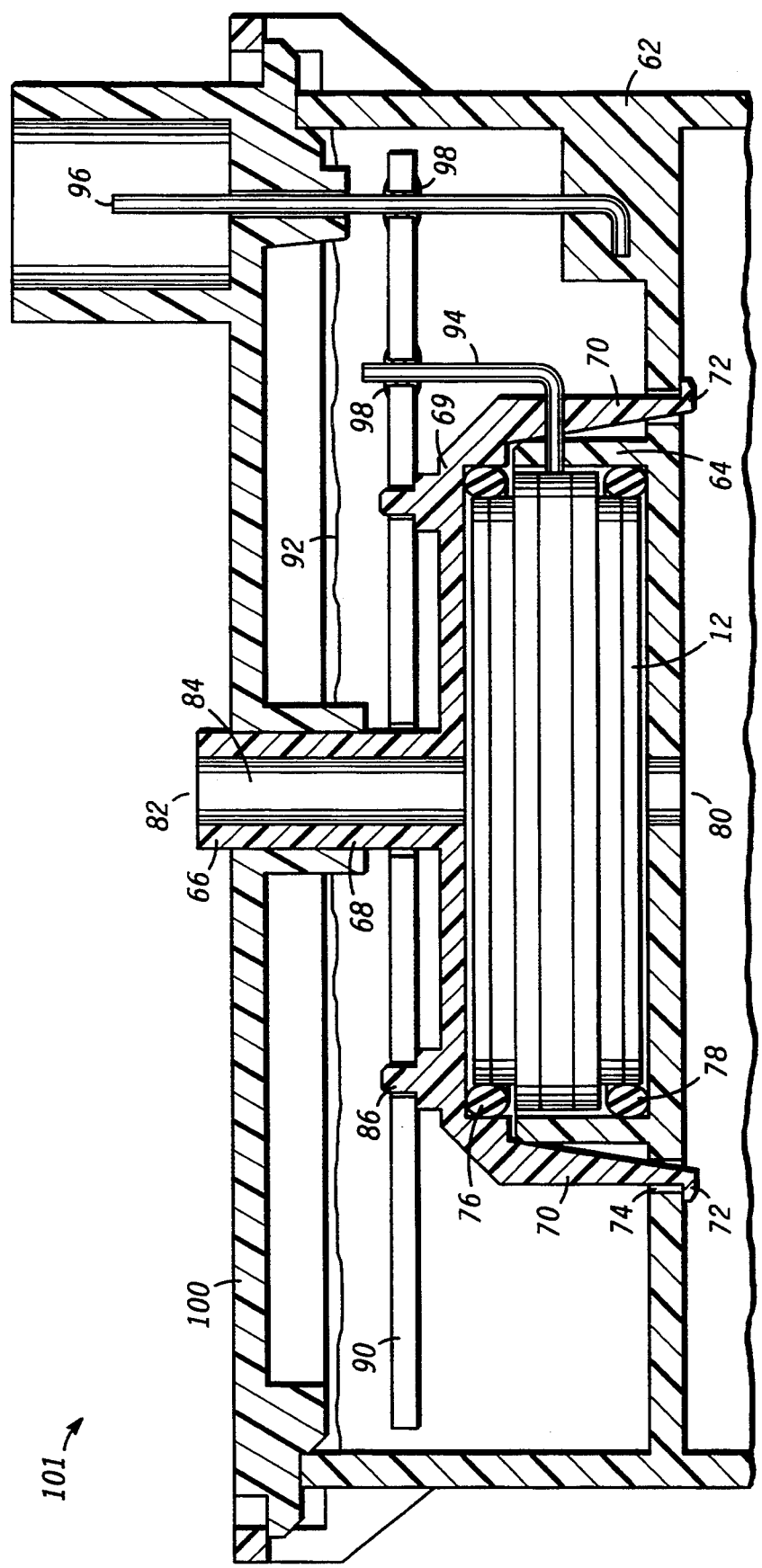

FIG. 4 illustrates a cross-section of a pressure sensor mounting assembly 101 according to a third embodiment of the present invention. Common elements in FIG. 4 use common reference numbers from FIG. 3. Assembly 101 is substantially similar to assembly 60 of FIG. 3, but in FIG. 4, positioning lugs 86 are disposed on base 69 of clamp 66. Circuit board 90 may freely move up and down positioning lugs 86 to accommodate thermal expansion such as by sensor leads 94 or output leads 96. As for FIG. 3, seal 76 in combination with passage 84 provides a sealed passage for connecting orifice 82 to sensor body 12. Seal 78 connects orifice 80 to sensor body 12.

By now, it should be appreciated that there has been provided a novel pressure sensor package that reduces stress on a pressure sensor contained within the package. Pressure sensors such as silicon semiconductor pressure sensing dies typically produce a full-scale pressure at pressures sufficiently low that the die can detect its own up or down orientation due to the influence of gravity. Such sensitive sensors are prone to parasitic stresses in their packaging, which are detected as false pressure readings. The present invention reduces the negative effects associated with mounting and other stresses which result from thermal expansion and contraction of dissimilar materials in the sensor packaging and thus avoids false pressure readings by the sensing die.

We claim:
1. A pressure sensor package comprising: a pressure sensor body; and an elongated stem having a first end connected to said sensor body, said stem including a connector disposed on a second end of said stem wherein said connector is fixedly mounted to a mounting base, an annular sealing surface disposed on said first end Wherein said annular sealing surface presses against a compressible seal, and an orifice disposed at said second end connected to a pressure sensing passage, wherein said seal is compressed when said stem is mounted to said mounting base.

2. The sensor package of claim 1 wherein said connector is spaced from said sensor body a sufficient distance to substantially reduce error-inducing stress on said pressure sensor.

3. The sensor package of claim 2 wherein said sealing surface is at least 38 mm from said connector.

4. The sensor package of claim 1 wherein said sensor body and said stem are plastic and are joined by an adhesive.

5. The sensor package of claim 1 wherein said connector is a lip disposed on said second end of said stem.

6. The sensor package of claim 5 wherein:
said mounting base has a lug;
a mating recess is disposed on said second end of said stem for snap-fitting to said lug; and
said seal prevents leakage of a vapor having its pressure sensed.

7. A pressure sensor assembly comprising:
a housing having a receptacle for holding a pressure sensor body, a positioner connected to said housing and an orifice disposed in said housing;
a clamp, having a shaft with an orifice disposed on an end thereof, that connects to said housing wherein said sensor body is secured in said receptacle between said housing and said clamp and wherein said sensor body is isolated from said housing and said clamp by at least one compressible seal so that said sensor body is connected by a sealed passage to at least one of said orifice of said shaft or said orifice of said housing; and
a circuit board located by said positioner within said housing and electrically connected to a pressure sensor lead, wherein said positioner constrains motion of said circuit board relative to said housing.

8. The assembly of claim 7 wherein a clearance between said positioner and said circuit board is provided to allow for thermal expansion of said sensor lead and an output lead connected to said circuit board.

9. The assembly of claim 7 wherein said sensor body essentially touches only compressible material when secured.

10. The assembly of claim 7 wherein:
said clamp has an arm having a lug for mating with a lug opening disposed in said housing, said lug of said arm mating with said lug opening with a snap-fit; and
said sensor body is secured by first and second compressible annular seals, said first seal disposed against a corner of said clamp and said second seal disposed against a corner of said housing.

11. The assembly of claim 10 further comprising a cover that mates with said housing to enclose said circuit board, said cover having a shaft opening wherein said shaft of said clamp extends through said cover.

12. A pressure sensor assembly comprising:
a housing having a receptacle for holding a pressure sensor body, said housing having an orifice disposed therein;
a clamp, having a shaft with an orifice disposed on an end thereof and a base with a positioner disposed thereon, that connects to said housing wherein said sensor body is secured in said receptacle between said housing and said clamp and wherein said sensor body is isolated from said housing and said clamp by at least one compressible seal so that said sensor body is connected by a sealed passage to at least one of said orifice of said shaft or said orifice of said housing; and
a circuit board located by said positioner within said housing and electrically connected to a pressure sensor lead, wherein said positioner constrains motion of said circuit board relative to said housing.

13. The assembly of claim 12 wherein said positioner is a lug protruding from said base of said clamp.

14. The assembly of claim 12 wherein:
said clamp has an arm having a lug for mating with a lug opening disposed in said housing, said lug of said arm mating with said lug opening with a snap-fit; and
said sensor body is secured by first and second compressible annular seals, said first seal disposed against a corner of said clamp and said second seal disposed against a corner of said housing.

15. The assembly of claim 14 further comprising a cover that mates with said housing to enclose said circuit board, said cover having a shaft opening wherein said shaft of said clamp extends through said cover.

16. A method of assembling a sensor package, comprising the steps of:
providing a pressure sensor body;
connecting a first end of an elongated stem to said sensor body, said stem including a connector disposed on a second end of said stem, an annular sealing surface disposed on said first end, and an orifice disposed at said second end connected to a pressure sensing passage; and
mounting said stem to a mounting base wherein a seal is compressed by said annular sealing surface and said connector is fixedly mounted to said mounting base.

17. The method of claim 16 wherein said sealing surface of said stem is at least 38 mm from said connector.

18. The method of claim 17 wherein said sensor body is formed of epoxy novolac, said stem is formed of polyphenyl sulfide, and said sensor body and stem are joined by an adhesive.

* * * * *